(12) United States Patent
Pattakos et al.

(10) Patent No.: US 9,677,434 B2
(45) Date of Patent: Jun. 13, 2017

(54) DISK ROTARY VALVE HAVING OPPOSED ACTING FRONTS

(71) Applicants: Manousos Pattakos, Nikea Piraeus (GR); John Pattakos, Nikea Piraeus (GR); Emmanouel Pattakos, Nikea Piraeus (GR)

(72) Inventors: Manousos Pattakos, Nikea Piraeus (GR); John Pattakos, Nikea Piraeus (GR); Emmanouel Pattakos, Nikea Piraeus (GR)

( * ) Notice: Subject to any disclaimer, the term of this patent is extended or adjusted under 35 U.S.C. 154(b) by 300 days.

(21) Appl. No.: 14/600,018

(22) Filed: Jan. 20, 2015

(65) Prior Publication Data

US 2015/0233270 A1 Aug. 20, 2015

(30) Foreign Application Priority Data

Feb. 14, 2014 (GB) .................................. 1402686.8
Apr. 18, 2014 (GB) .................................. 1407012.2

(51) Int. Cl.
*F16K 25/00* (2006.01)
*F01L 7/06* (2006.01)
*F02B 1/12* (2006.01)
*F01L 7/02* (2006.01)

(52) U.S. Cl.
CPC ................. *F01L 7/06* (2013.01); *F01L 7/027* (2013.01); *F02B 1/12* (2013.01); *F16K 25/00* (2013.01)

(58) Field of Classification Search
USPC .................................. 251/180; 123/200, 331
See application file for complete search history.

(56) References Cited

U.S. PATENT DOCUMENTS

| | | | | |
|---|---|---|---|---|
| 5,330,157 | A * | 7/1994 | Dern | F16K 1/24 251/162 |
| 5,967,108 | A * | 10/1999 | Kutlucinar | F01L 7/16 123/190.6 |
| 7,584,741 | B2 * | 9/2009 | Thomas | F01L 7/023 123/190.1 |
| 7,841,308 | B1 * | 11/2010 | Muth | F01L 7/08 123/190.4 |
| 9,303,637 | B2 * | 4/2016 | Pattakos | F04B 39/0016 |
| 2002/0079740 | A1 * | 6/2002 | Eggleston | F16K 1/2263 307/43 |
| 2008/0003124 | A1 * | 1/2008 | Eisenmann | F03C 2/22 418/61.3 |
| 2014/0238358 | A1 * | 8/2014 | Arens | F01L 7/06 123/495 |

* cited by examiner

*Primary Examiner* — Nina Bhat (57) ABSTRACT

A disk rotary valve assembly for reciprocating piston positive displacement machines, the disk rotary valve having a pair of oppositely arranged fronts, the forces on the pair of oppositely arranged fronts due to the high pressure inside the chamber cancel each other leaving the supports of the disk rotary valve unloaded and improving the sealing quality.

19 Claims, 10 Drawing Sheets

DISK ROTARY VALVE HAVING OPPOSED ACTING FRONTS

BACKGROUND ART

In comparison to the conventional poppet valve engines wherein the high pressure in the cylinder just pushes the valves harder against their seats without having effect on the valve actuation mechanism, in the rotary valve engines the basic problem is that the high pressure in the cylinder loads strongly the valve system; the rotary valve is pushed heavily against the cylinder head degrading the sealing quality and causing excessive friction and seizure; the strong forces acting on the rotary valve while it is moving, make things even worse. The deformation of the combustion chamber due to both, the high pressure and the temperature differences, substantially affects the sealing quality provided by the state-of-the-art rotary valves.

SUMMARY OF THE INVENTION

It is an object of the present invention to address the above disadvantages. Accordingly, there is provided a rotary valve for reciprocating piston machines as defined in the appended claims.

The disk rotary valve of the present invention rotates in synchronization to the crankshaft and comprises a pair of oppositely arranged fronts; the fronts comprise valve ports. The combustion (or compression) chamber comprises at least a pair of oppositely arranged chamber ports, each chamber port having a lip being in sealing cooperation with its respective front on the disk rotary valve. The orthogonal projections of the oppositely arranged fronts on the rotation axis of the disk rotary valve being at a substantial distance from each other (i.e. the opposed acting fronts are disposed at opposite sides of a plane normal to the rotation axis of the disk rotary valve).

When a valve port passes over its respective chamber port, the chamber communicates with the intake or with the exhaust system; the reciprocating piston either suctions gas from the intake system, or expels the burnt gas out to the exhaust.

The objective is the pressure into the chamber to cause a pair of substantially equal and opposite forces on the two fronts of the rotary valve so that these two forces to cancel each other "internally" (i.e. inside the body of the rotary valve) leaving the bearings of the rotary valve unloaded, no matter how strong is the pressure into the chamber. The structure of the rotary valve needs to be substantially rigid/stiff/inflexible in order to take/undergo, without serious degradation of the sealing between the fronts and the chamber ports, the pair of the heavy forces imposed by the high pressure during the combustion in an internal combustion engine (or during the compression in a compressor), so that the rigidity, and thereby the sealing, is an internal "affair" of the rotary valve itself, leaving its supporting system substantially unloaded. The structure of the rotary valve can be reinforced as required without side effects, because the motion of the rotary valve is a rotation in synchronization to the crankshaft: the more the inertia of the rotary valve, the smoother the operation of the engine because the moment of inertia of the rotary valve is added to the moment of inertia of the crankshaft/flywheel. The opposite happens with the reciprocating poppet valves wherein the increase of the reciprocating mass causes significant side effects.

DETAILED DESCRIPTION OF THE INVENTION

The sealing of a disk rotary valve having flat fronts is tolerant to deformations of the cylinder head because, as before, only the one of the three dimensions does matter: that one along the rotation axis of the disk rotary valve; significant deformations of the chamber along the other two dimensions do not substantially effect the sealing. Between its chamber ports the chamber (the cavity 11) is like an open ring; if the diameter of the ring is for some reason increased (due to the high pressure into the chamber, for instance, or due to the temperature etc) the sealing is not affected. The pressure in the chamber cannot significantly affect the width of the ring, i.e. it cannot affect the dimension of the "ring" along the rotation axis of the rotary valve. The lower part of the chamber is "enclosed" and is strongly supported by the lower end of the cylinder head. With the dimension of the ring shaped chamber (cavity 11) among the chamber ports being relatively small along the rotation axis of the disk rotary valve (compact chamber), proportionally small is the effect of the temperature difference between the rotary valve and the chamber walls on the sealing. In comparison, in the case of spherical rotary valves the deformation of the chamber at any direction spoils substantially the sealing.

Even in the case wherein the same disk rotary valve controls both, the intake and the exhaust processes, the tolerance of the sealing in significant displacements of the disk rotary valve normal to its rotation axis (i.e. wherein the flat fronts keep their planes) enables a variable timing and a variable duration as in the state-of-the-art variable valve actuation (or VVA) systems. For instance, lifting for a few mm the rotation axis of a disk rotary valve that normally provides a long "duration" (for the intake and the exhaust)

and a big "overlap", the overlap can be eliminated while the duration can be reduced substantially. This control (i.e. the displacement of the rotation axis of the disk rotary valve) is easy, lightweight and reliable because the disk rotary valve cancels the heavy forces internally without loading its bearings, without causing deformation on the cylinder head and without a tendency to leave its place.

The form of the combustion chamber is improved. With proper design, the combustion chamber can provide the required swirl and turbulence in order, for instance, to meet the needs of a compression ignition engine.

In a variant of the present disk rotary valve, the two flat fronts are the external surfaces of the same disk. This arrangement fits better to compressors wherein a divided chamber is not a problem. The structure of the disk rotary valve becomes even stiffer.

Preferred Embodiments

In a first embodiment, FIGS. 1 to 4, the rotary valve 1 comprises a strong hub 2 integral with two disks 3, 4 at its ends. The distance between the two disks is substantially smaller than the bore of the cylinder to provide a compact combustion chamber and to reduce the bending/deformation of the rotary valve. The cylinder head 5 comprises bearings 6 wherein the shaft 7 of the rotary valve is rotatably mounted. The shaft 7 is thin because it is rid of heavy loads, while the hub 2 is massive in order to keep the two disks exactly parallel to each other and at an exact distance from each other despite the strong and eccentric (relative to the rotation axis 60) forces acting on their inner flat fronts 8. The disks 3, 4 are substantially stronger at their regions that cover the chamber ports during the high pressure into the combustion chamber (i.e. during the combustion, during the last part of the compression, and during the initial part of the expansion); at those regions the disks are solid (full of material, rid of passages). The disks comprise exhaust valve ports 9, and intake valve ports 10. The cylinder head 5 comprises a cavity 11 having at opposite sides a pair of chamber ports 12, each having a flat lip 13, each flat lip 13 being in sealing cooperation with the respective flat front 8 of the disk rotary valve 1. The external flat surfaces 14 of the discs cooperate with respective flat surfaces 15 on the cylinder head 5. Through passages 16 made in each disk, the exhaust valve port 9 communicates with a respective passageway/exhaust port 17 on the cylinder head 5; through proper recesses 18 made on each disk, the intake valve port 10 communicates with the space 19 around the periphery of the disk, which in turn communicates with a respective passageway/intake port 20 on the cylinder head. In this design, any gas leakage through the chamber ports 12 out of the combustion chamber 50 ends into the space 19 around the peripheries of the disks. With the spaces 19 being sealed from the exhaust, the gas leakage re-enters (is recycled) into the combustion chamber during the next suction cycle. This way, even before the engine gets at its normal operating temperature (wherein the clearances are minimized and the sealing is optimized) no unburned gas can go to the exhaust.

The rotary valve rotates at half crankshaft speed. Only the flat surfaces of the disks need to take part in the sealing, while the cylindrical peripheries of the disks need not.

Figure 1:
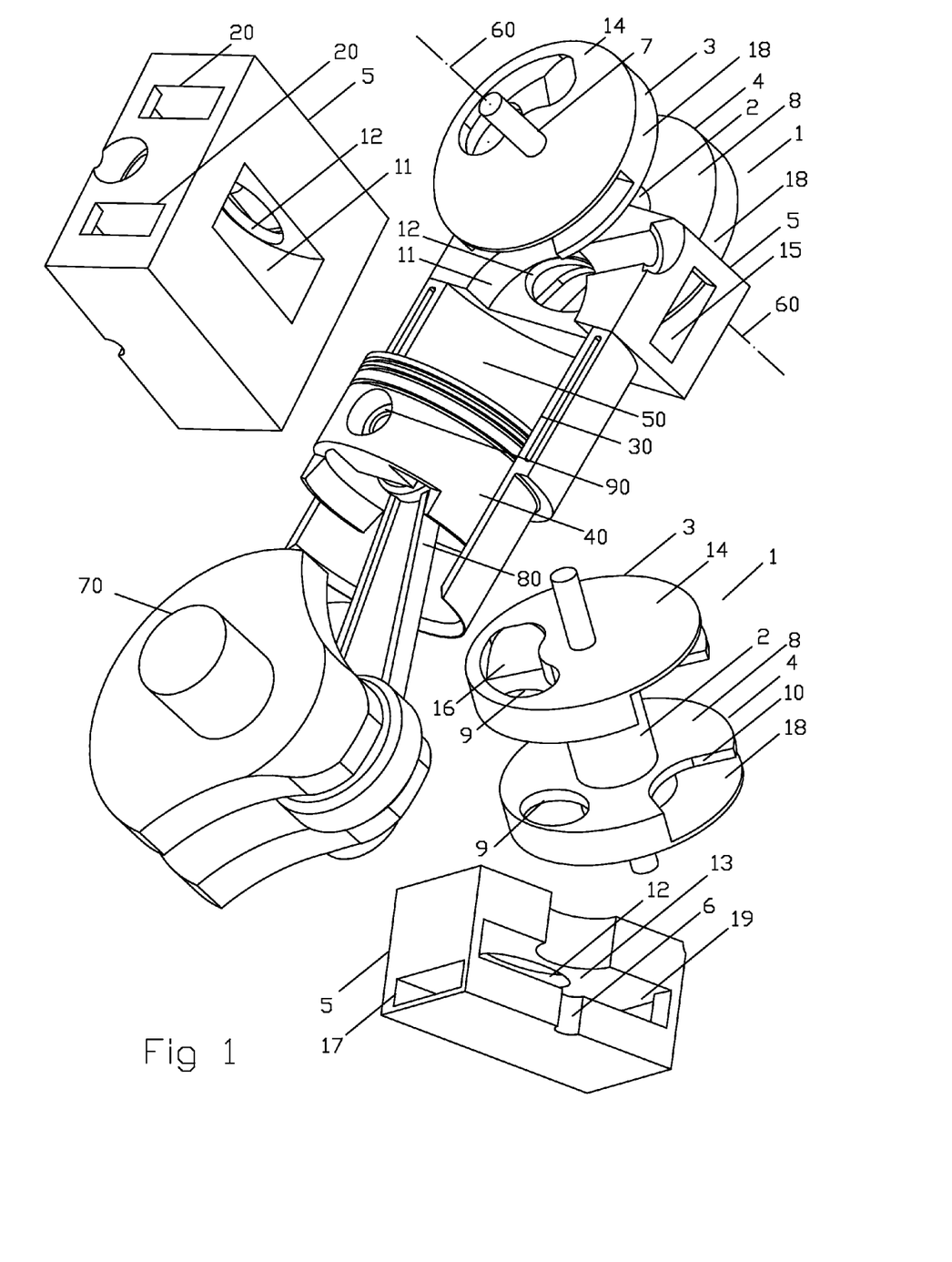
FIG. 1 shows a four stroke reciprocating piston engine having a rotary valve of the first embodiment of the invention.
Figure 2:
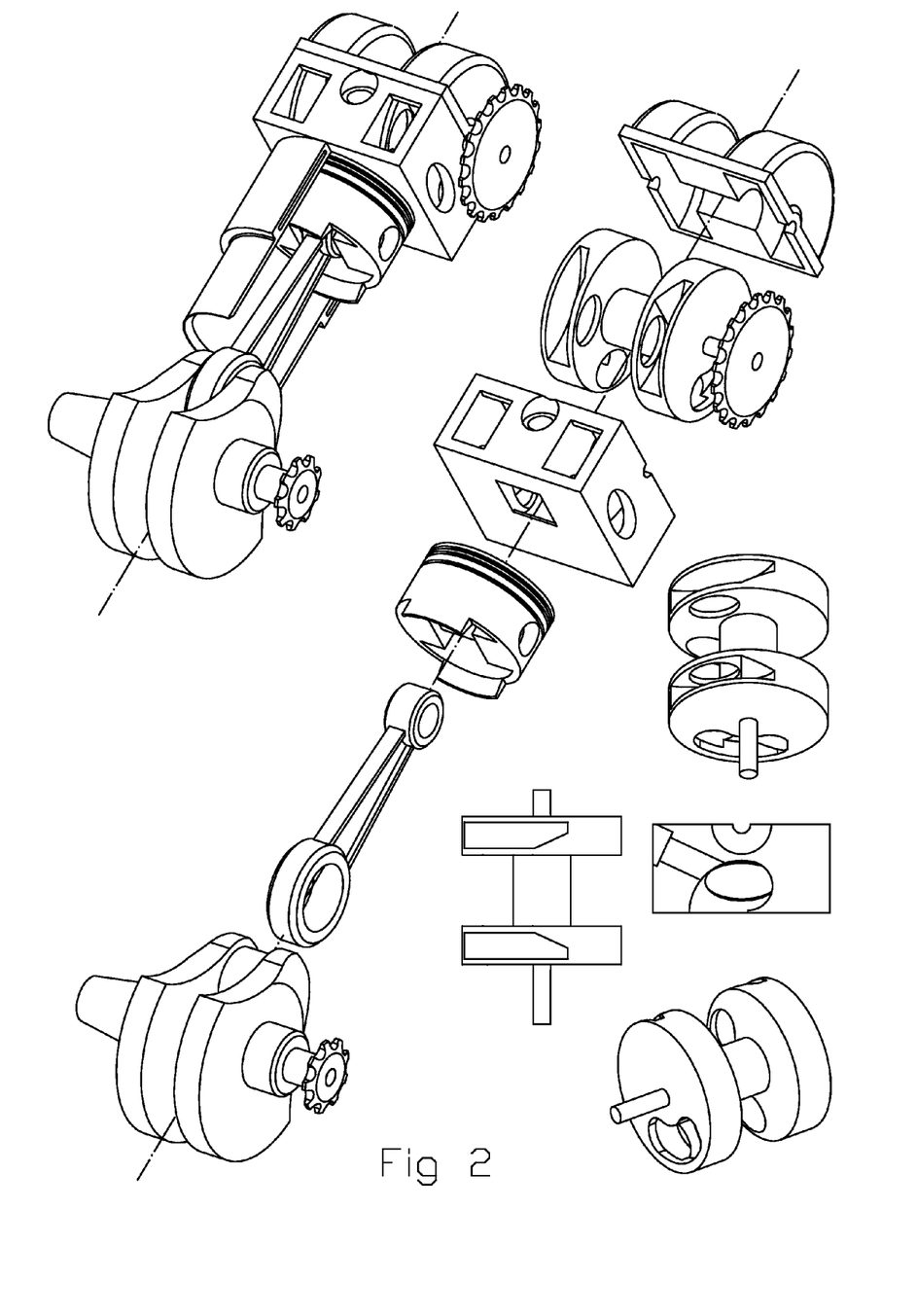
FIG. 2 shows the reciprocating piston engine having the rotary valve with a variant of the first embodiment.

In FIG. 2 it is shown a variant of the first embodiment. The two disks of the rotary valve are substantially reinforced (wider disks). The asymmetric design of the bottom of the cavity (the cylinder head is shown sliced at bottom right) amplifies the turbulence and swirl at the end of the compression, significant for high-speed compression ignition engines. The exhaust ports are at the sides of the cylinder head. With a timing chain (not shown) the sprocket of the crankshaft drives the sprocket of the rotary valve at half crankshaft speed. The cover of the cylinder head is also shown.

Figure 3:
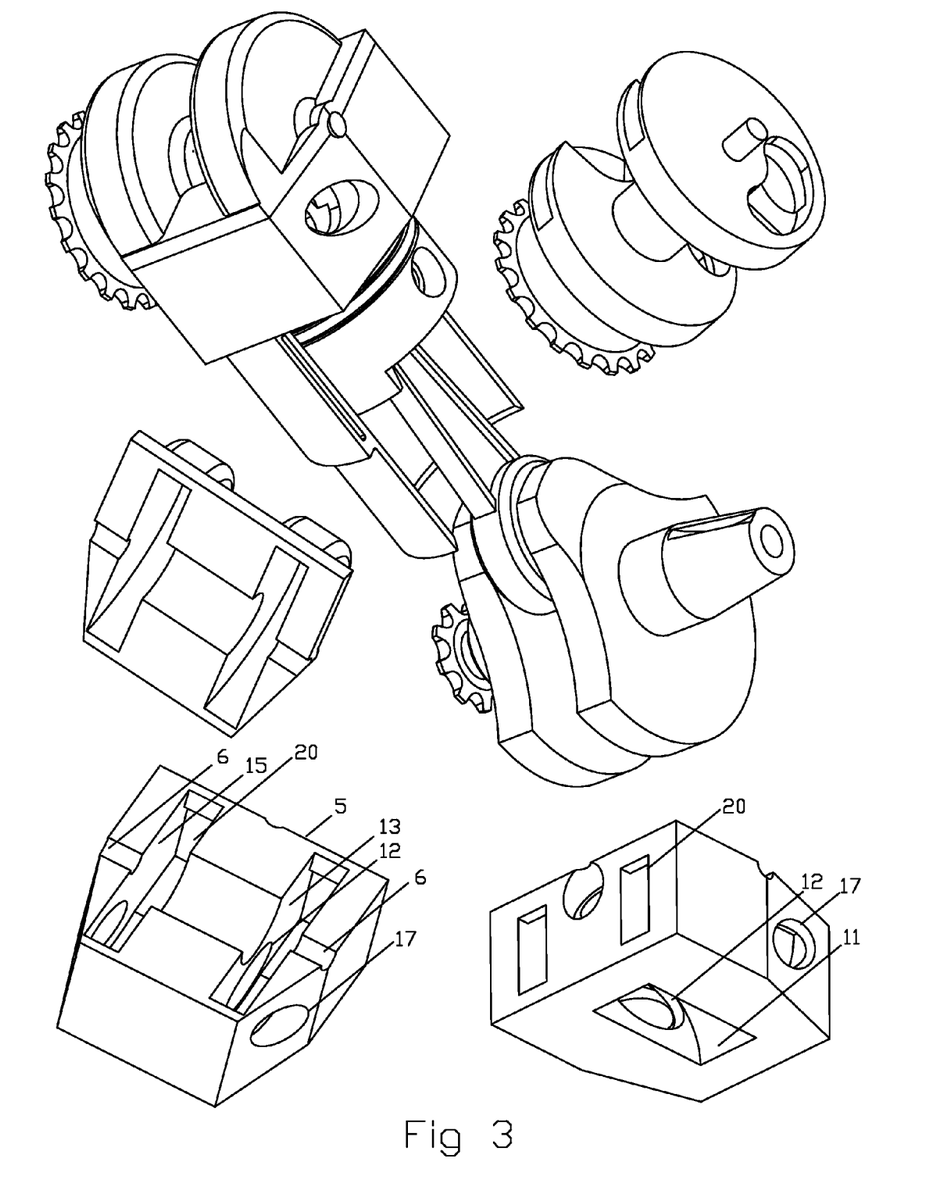
FIG. 3 shows the disassembled rotary valve with a variant of the first embodiment.

In FIG. 3 it is shown another variant of the first embodiment. In the cylinder head 5 there are flat surfaces 15 that cooperate with the respective external flat surfaces 14 of the disks. The exhaust ports 17 are at the sides of the cylinder head.

Figure 4:
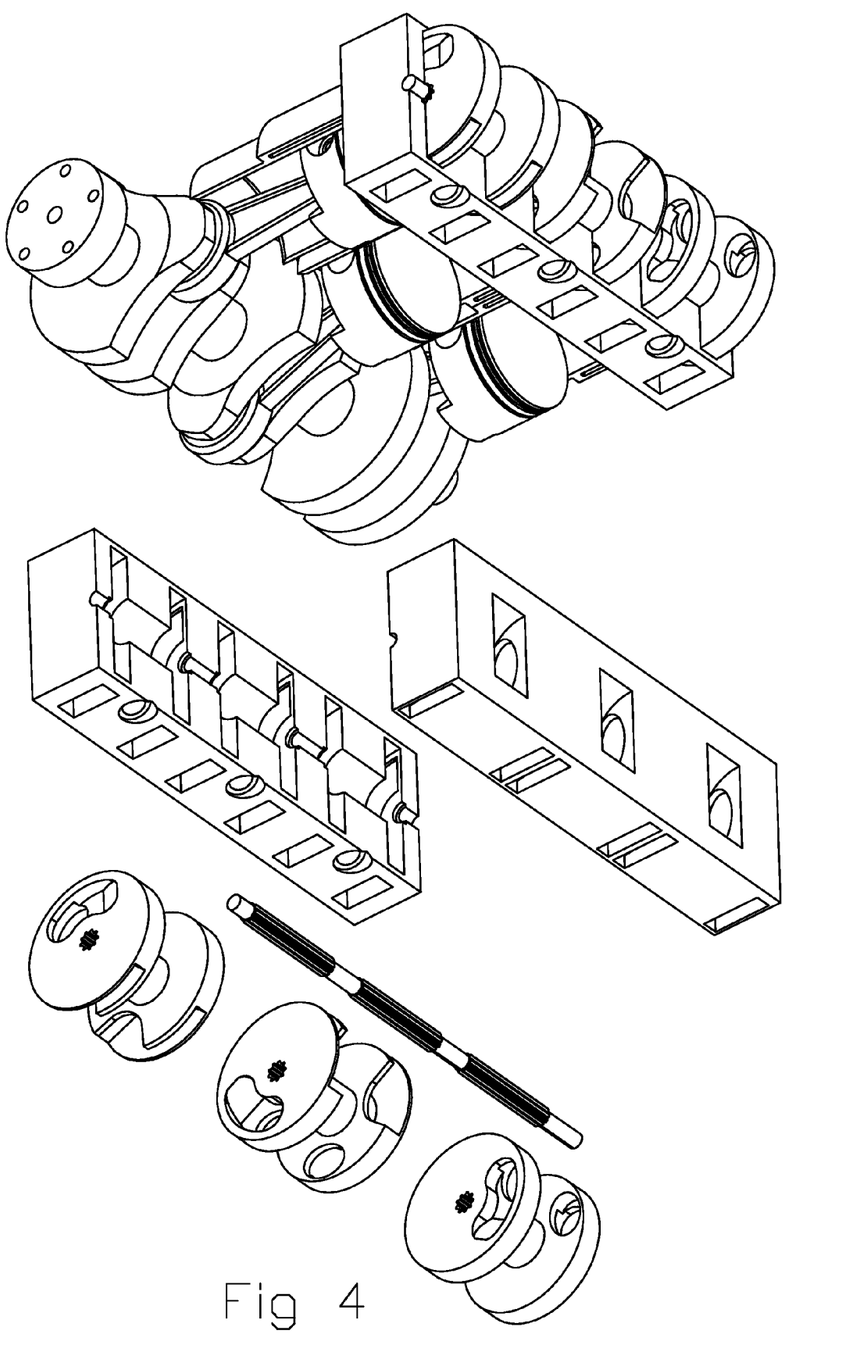
FIG. 4 shows a three cylinder in line engine having three rotary valves.

In FIG. 4 it is shown another variant of the first embodiment. The disk rotary valve with the oppositely arranged fronts is applied on an in-line three-cylinder four-stroke engine. At top it is the engine with the cylinder head and the rotary valve (the cover of the cylinder head is not shown). At left middle it is shown the cylinder head alone, having six intake ports (one per chamber port). At middle right they are shown the cylinder head from below, the three cavities, some of the chamber ports and the six exhaust ports (one per chamber port). At bottom it is shown disassembled the set of the three disk rotary valves and the splined shaft that drives them. Each of the three disk rotary valves (one per cylinder) has a splined hole at its center; the splined shaft passes through the splined holes of the three disk rotary valves and makes them rotate with half crankshaft speed. The connection allows the self-alignment of the disk rotary valves along the engine: during a thermal expansion (or contraction) of the cylinder head, each disk rotary valve slides along the splined shaft, remaining in friction-free sealing cooperation with its respective chamber ports.

Figure 5:
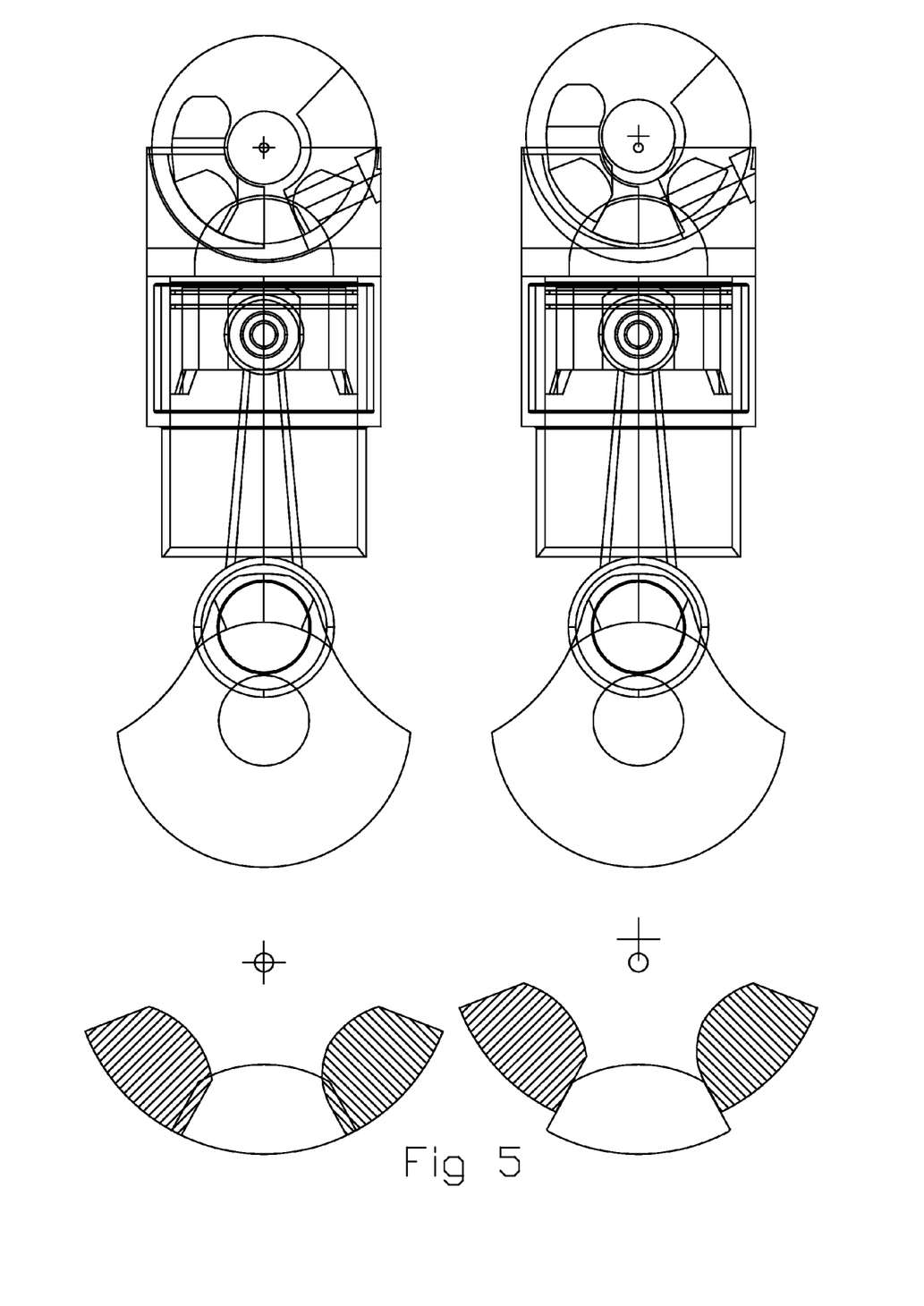
FIG. 5 shows a four stroke reciprocating piston engine having a linearly displaceable rotary valve of the second embodiment of the invention.

In a second embodiment, FIG. 5, the parts of the engine are shown transparent. The engine is at the TDC. At the bottom of the figure they are shown, magnified, the intake and exhaust ports (hatched areas) and the chamber port (not hatched). The center of the rotary valve is at the cross. At left the rotary valve is at its normal position, providing a long intake and exhaust duration, large port area and a significant overlap between the intake and the exhaust. At right the rotary valve is lifted for a few mm (i.e. its bearings are lifted for a few mm by a linkage). This is easy because the loads on the fronts are taken internally, leaving the disk valve bearings unloaded and making easy the controllable displacement. The sealing quality is not affected. The overlap is zero (the intake starts after the end of the exhaust) as shown in the bottom right wherein there is not intersection between the hatched areas (intake valve port and exhaust valve port) and the chamber port. The valve area and the valve duration are decreased. With infinite intermediate positions for the rotary valve, a variable valve actuation system results providing continuously variable duration, continuously variable timing and continuously variable overlap.

Figure 6:
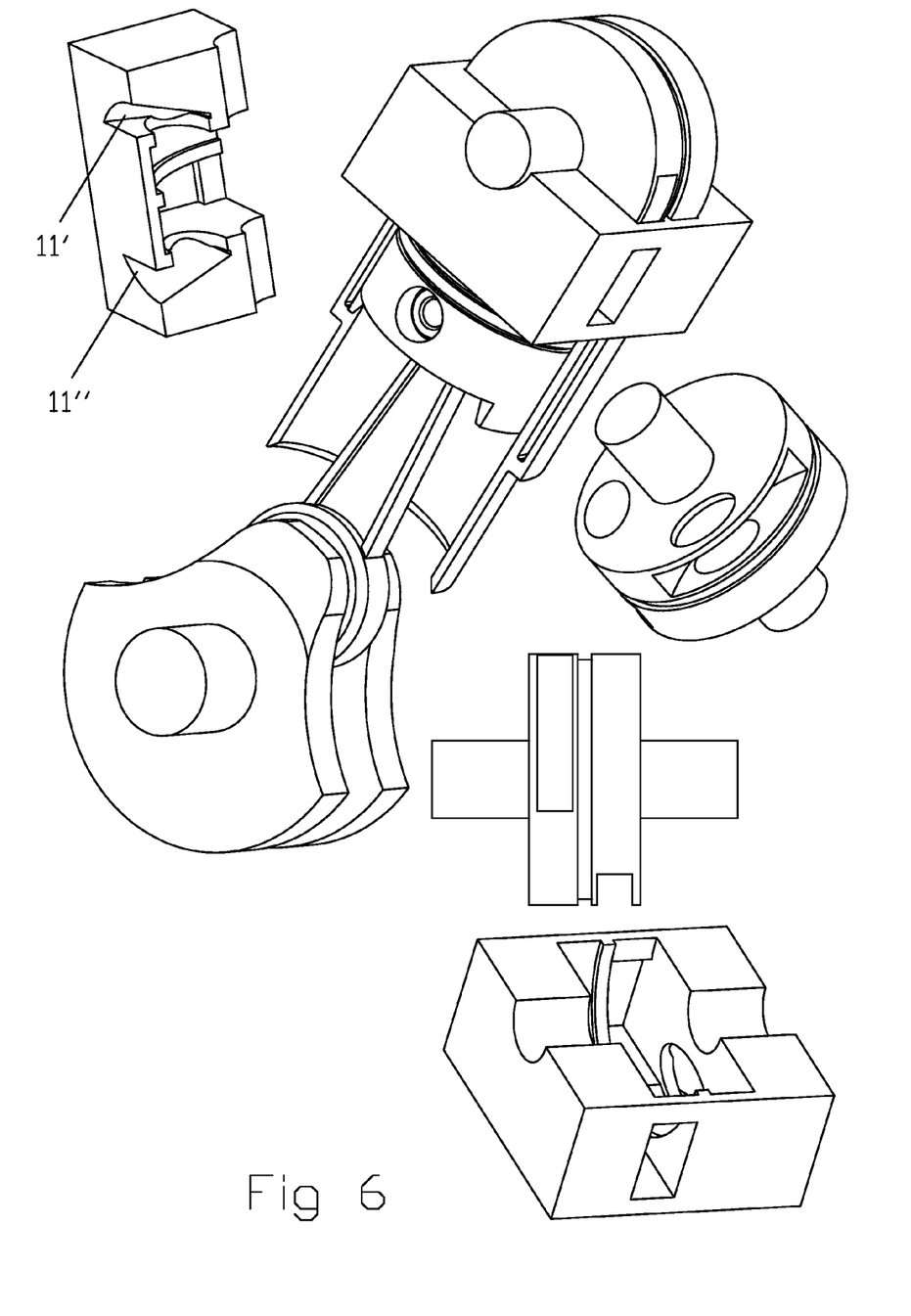
FIG. 6 shows a reciprocating piston engine having a "single" disk rotary valve of the third embodiment of the invention.

In a third embodiment, FIG. 6, the rotary valve comprises only one disk having valve ports at its two flat fronts (they are arranged back to back). The combustion chamber is divided and comprises two cavities 11' and 11", each having a chamber port, the chamber ports arranged at the two sides of the disk. With the shallow groove at the middle of the disk, and a respective ring on the cylinder head, the space at the periphery of the disk is divided into an intake plenum and an exhaust plenum sealed from each other. For four stroke engines the rotary valve rotates at half crankshaft speed. Due to the large surface of the divided chamber, this arrangement better fits with compressors. In case of compressor, the rotary valve rotates with the speed of the crankshaft, while the ports and their timing are properly designed.

Figure 7:
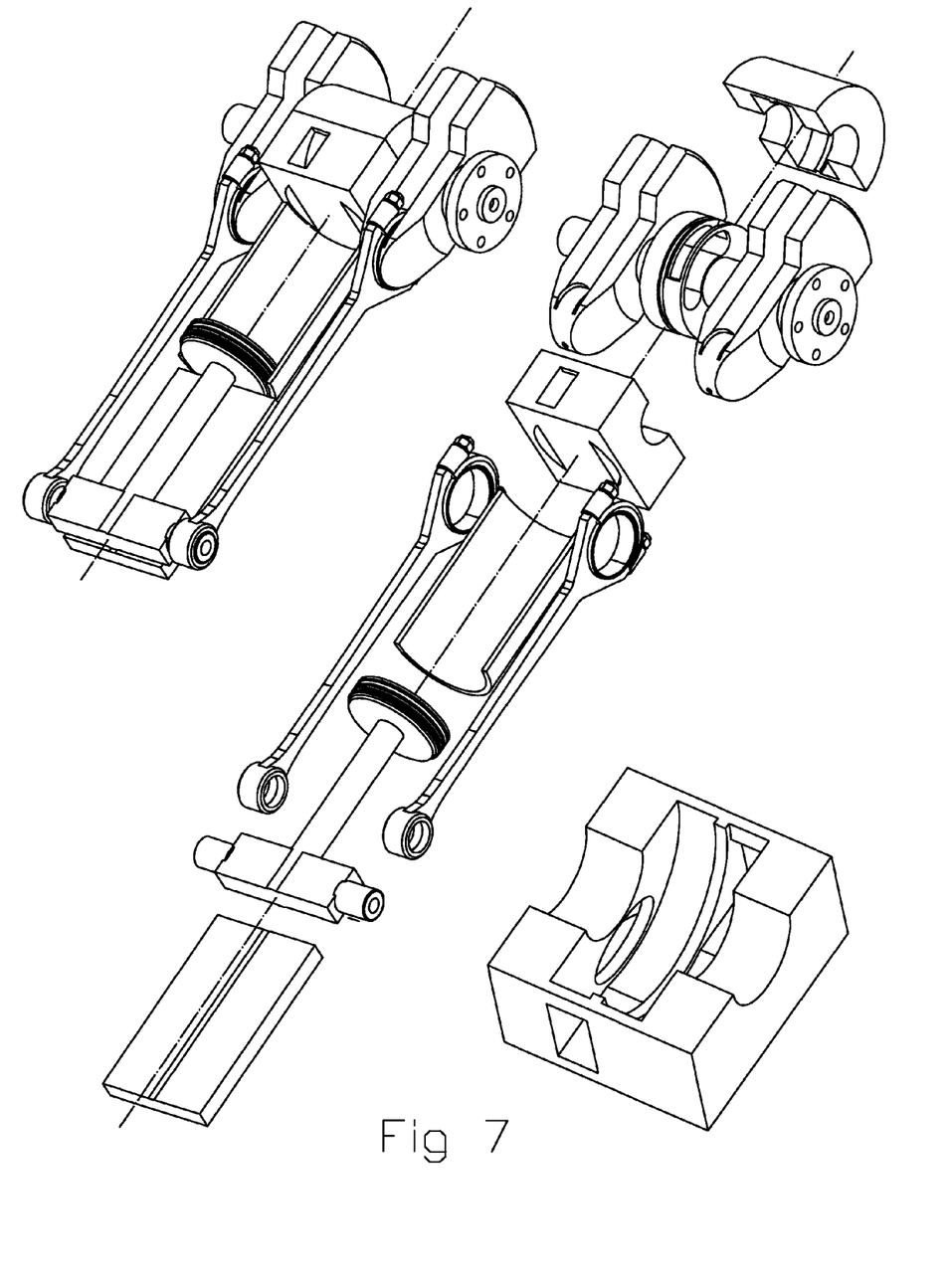
FIG. 7 shows compressor having the rotary valve with a variant of the third embodiment.

FIG. 7 shows a variant of the third embodiment. It is a crosshead pulling-rod compressor (only the one slider guide is shown). The architecture is quite simple: the rotary valve is integral with the crankshaft; the rotation of the crankshaft causes the reciprocation of the piston; during the suction stroke, the disk rotary valve allows the communication of the cylinder with the inlet passageways of the cylinder head, and the cylinder fills with gas. During an initial part of the compression, the chamber ports remain closed to prevent compressed gas to return to the cylinder; later the disk rotary valve allows the communication of the chamber with the exhaust passageways of the cylinder head, and the piston pushes the compressed gas to the exhaust.

Figure 8:
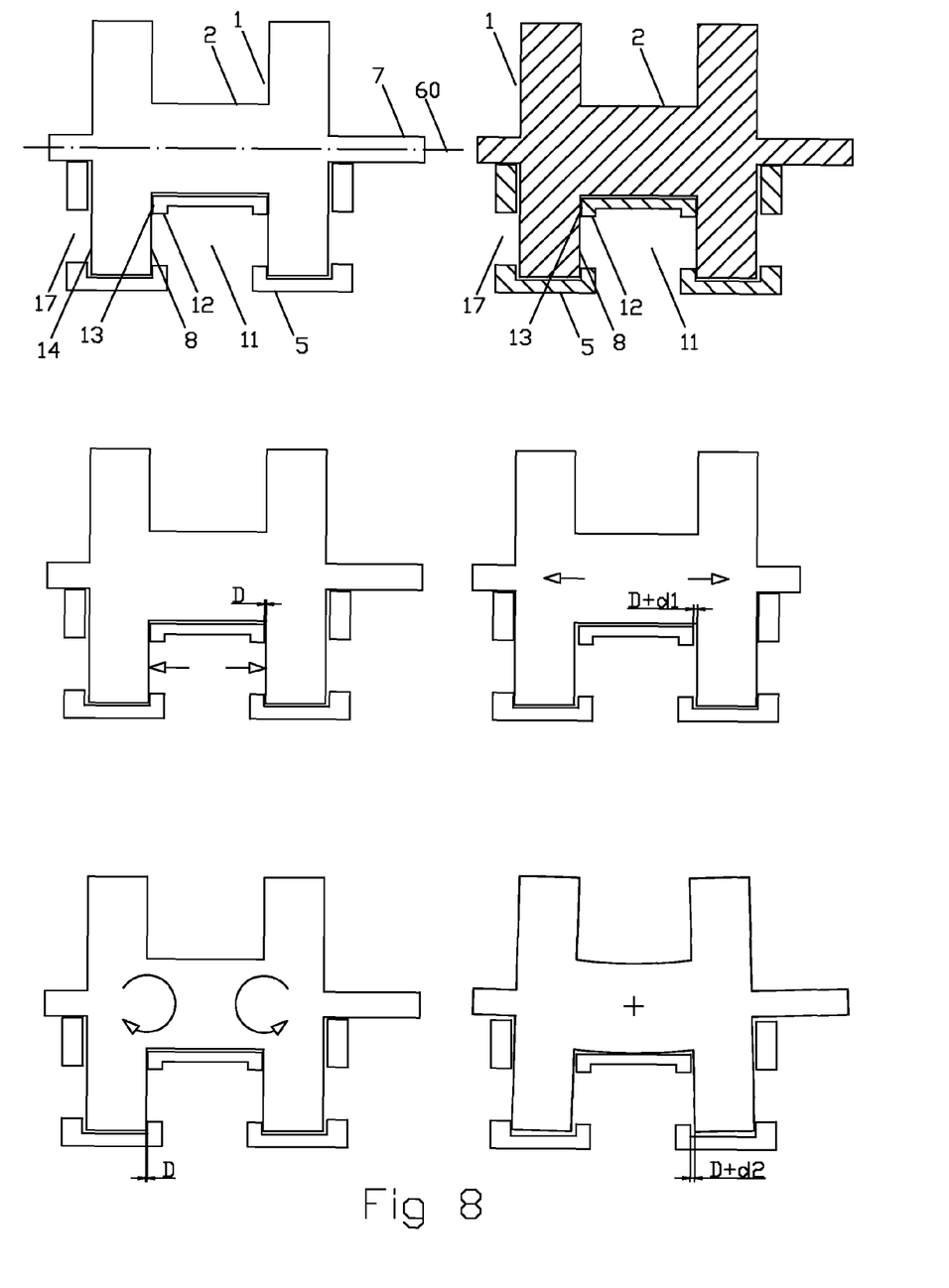
FIG. 8 shows sections of the cylinder head of the engine shown in FIG. 2.

In the FIG. 8 it is graphically explained the significance of a strong and short hub. FIG. 8 shows at top left the section of the cylinder head and of the disk rotary valve of the engine of FIG. 2 by the plane wherein the cylinder axis and the rotation axis of the disk rotary valve reside. At top right the hatching distinguishes the two parts. At middle left the arrows are the forces applied, due to the high-pressure in the cavity 11, on the two oppositely disposed fronts 8 of the disk rotary valve 1.

Without pressure in the cavity 11 (i.e. in the chamber) the clearance between each front 8 and its respective lip 13 is D.

With a pressure in the cavity 11, they result on the two oppositely arranged fronts two opposite forces (the arrows) substantially eccentric with reference to the rotation axis 60. This pair of forces is equivalent with:

a pair of forces acting along the rotation axis 60 and forcing to lengthen the hub and to increase the clearance between the chamber port lips 13 and the fronts 8 as shown at middle right, and a torque forcing to bend the hub 2 (as shown at bottom left) and so to increase the clearance between the fronts 8 and the lower side of the chamber port lips 13 (as shown at bottom right).

These two deformations are accumulative. The increase of the clearance between the chamber port lip 13 and the front 8 is proportional to the length of the hub between the two disks. Reducing the distance between the oppositely arranged fronts 8 substantially below the cylinder bore (or even below half of the cylinder bore), and increasing the external diameter of the hub 2 as much as the chamber ports allow, the sealing quality is improved and the combustion chamber becomes more compact.

Figure 9:
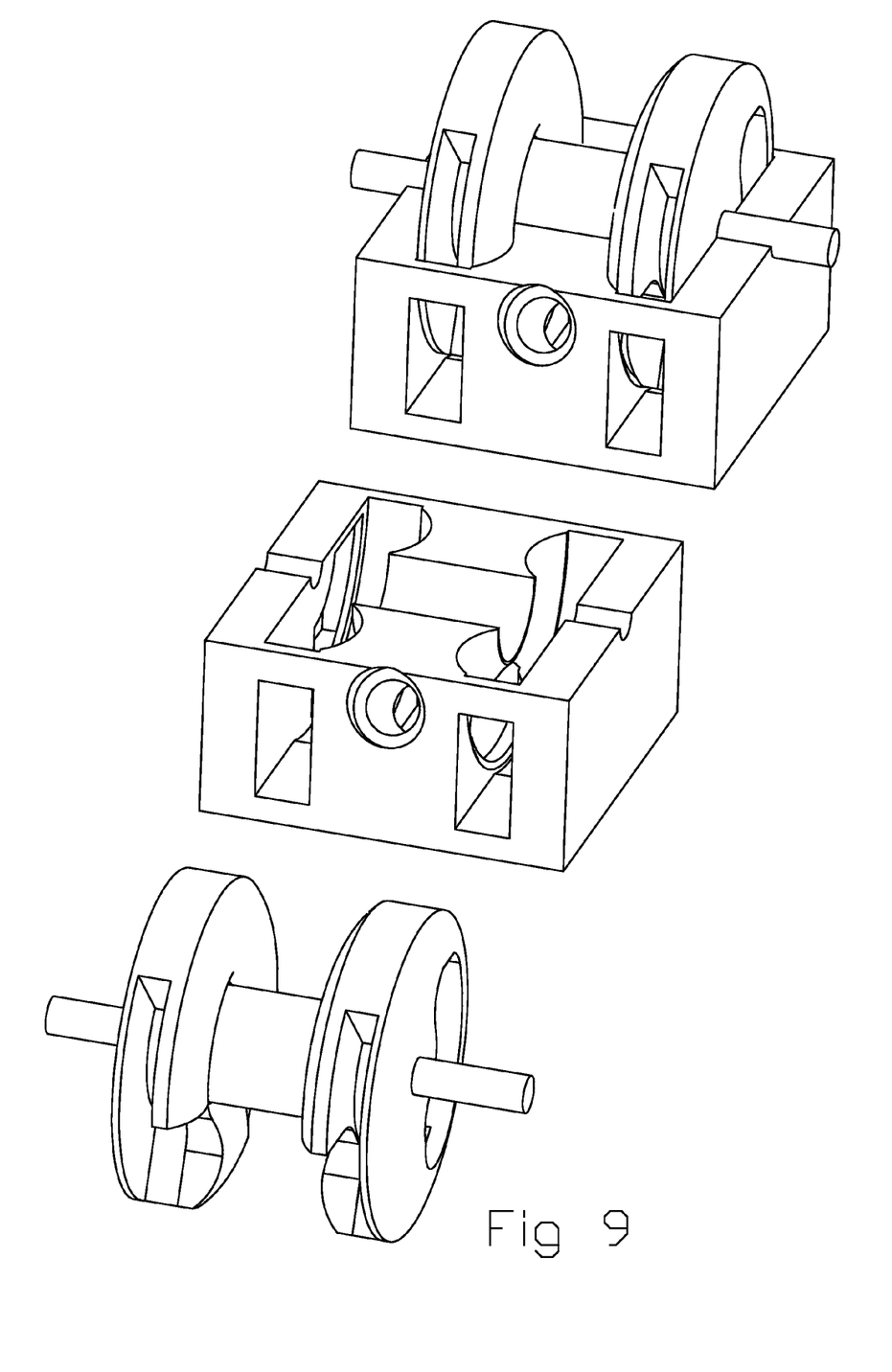
FIG. 9 shows a four stroke reciprocating piston engine having a rotary valve with non-plane fronts of the fourth embodiment of the invention.

In a forth embodiment, FIG. 9, the fronts of the rotary valve are not flat. The fronts are surfaces of revolution, with the shape of the chamber port lips sealingly fitting with the fronts.

Figure 10:
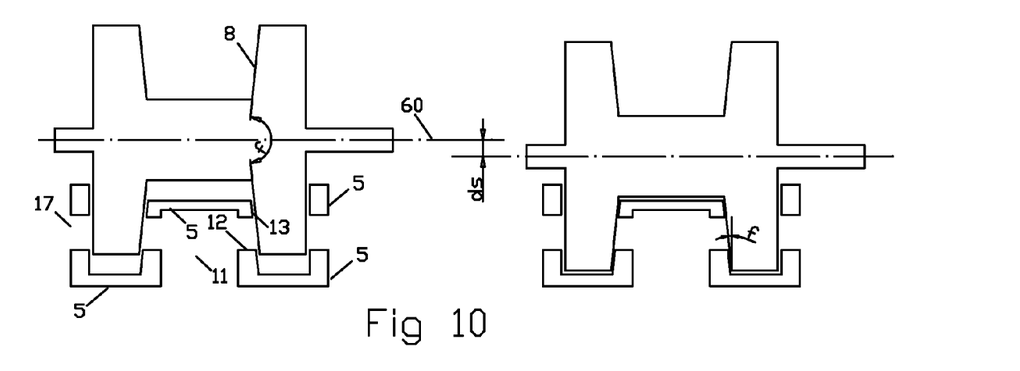
FIG. 10 shows sections of the cylinder head of a reciprocating piston engine having a rotary valve of the fifth embodiment of the invention.
Figure 11:
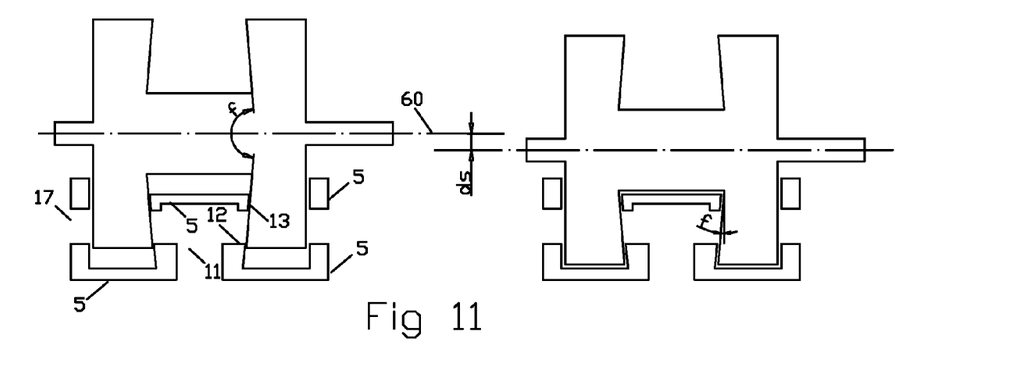
FIG. 11 shows sections of a cylinder head of a reciprocating piston engine having a rotary valve of the sixth embodiment of the invention.
Figure 12:
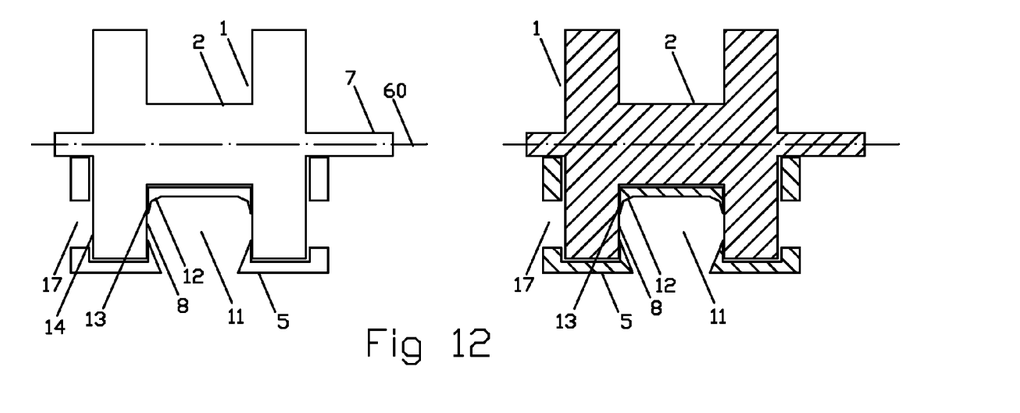
FIG. 12 shows sections of the cylinder head of a variant of the engine shown in FIG. 2.

In a firth embodiment, FIG. 10, the rotation axis 60 of the rotary valve 1 is displaceable relative to the cylinder head 5, and the front surfaces 8 of the rotary valve 1 are wide cones, i.e. cones having an aperture angle f near 180 degrees. By displacing the rotation axis 60 of the rotary valve 1 relative to the cylinder head 5, the conical rotary valve varies/controls the clearance between the front surfaces 8 of the rotary valve 1 and the respective lips 13 of the chamber ports 12. At the left side of FIG. 10 the clearance between the rotary valve fronts 8 and the cylinder head lips 13 is large, for instance due to a temperature difference between the rotary valve and the cylinder head. At the right side of FIG. 10 the rotation axis 60 of the rotary valve 1 is displaced, by ds, closer to the cylinder 5 so that the clearance between the rotary valve fronts 8 and the cylinder head lips 13 is substantially smaller. Due to the wide cone, the total force acting on the rotary valve 1 due to the high pressure inside the combustion chamber 11 is small and manageable. For instance, if the aperture angle f is 178 degrees, the total force on the rotary valve (i.e. the force the mechanism that holds the bearings of the rotary valve needs to apply) is less than 2% of the force acting on each rotary valve front surface.

The known sealing means from the art, like "O" rings etc, can be used.

Although the invention has been described and illustrated in detail, the spirit and scope of the present invention are to be limited only by the terms of the appended claims.

What is claimed is:

1. A disk rotary valve assembly for reciprocating piston positive displacement machines, the disk rotary valve assembly comprising at least:
   a cylinder (30);
   a cylinder head (5);
   a piston (40) reciprocally fitted in the cylinder (30);
   a chamber (50) defined inside the cylinder (30), the chamber (50) is sealed at one side by the piston (40), the chamber (50) is sealed at another side by the cylinder head (5);
   the cylinder head (5) comprising passageways (20, 17) for the introduction of gas in the chamber (50) and for the evacuation of the chamber (50) from the gas;
   the cylinder head (5) comprising a pair of oppositely arranged chamber ports (12), each chamber port comprising a lip (13) at its end;
   a disk rotary valve (1), the disk rotary valve (1) being rotatably mounted in the cylinder head (5), the disk rotary valve (1) rotating about a rotation axis (60) in synchronization to the piston reciprocation;
   the disk rotary valve (1) comprising a pair of oppositely arranged fronts (8), each front (8) being a side-wall of a disk of the disk rotary valve (1) and rotates together with the rotary valve each lip (13) being in gas tight sealing cooperation with a respective front (8) of the disk rotary valve (1), the orthogonal projections of the oppositely arranged fronts (8) on the rotation axis (60) of the disk rotary valve (1) being at a substantial distance from each other;
   the disk rotary valve (1) comprising valve ports (10, 9), during a part of a rotation of the disk rotary valve (1) the chamber (50) communicates, through the valve port (10, 9) with passageways (20, 17), during another part of a rotation of the disk rotary valve (1) the fronts (8) seal the chamber ports (12), isolating the chamber (50) from the passageways (20, 17),
   the chamber ports (12) being arranged so that the total force applied on the disk rotary valve (1) due to a high pressure inside the chamber (50) to be several times smaller than the force applied separately on each front (8) due to the same high pressure inside the chamber (50).

2. A disk rotary valve assembly for reciprocating piston positive displacement machines, as in claim 1, wherein:
   the fronts (8) and the lips (13) are substantially flat surfaces with planes substantially normal to the rotation axis (60) of the disk rotary valve (1).

3. A disk rotary valve assembly for reciprocating piston positive displacement machines, as in claim 1, wherein:
   the fronts and the lips are substantially flat surfaces with planes substantially normal to the rotation axis of the disk rotary valve, the disk rotary valve comprises a pair of disks at a substantial distance from each other with a hub firmly connecting them, the fronts are arranged to face each other, the chamber ports are arranged in the space between the fronts.

4. A disk rotary valve assembly for reciprocating piston positive displacement machines, as in claim 1, wherein:
the fronts and the lips are substantially flat surfaces with planes substantially normal to the rotation axis of the disk rotary valve, the disk rotary valve comprises a pair of disks at a substantial distance from each other with a hub firmly connecting them, the fronts are arranged to face each other, the chamber ports are arranged in the space between the fronts, the distance of the fronts is substantially smaller than the bore of the cylinder.

5. A disk rotary valve assembly for reciprocating piston positive displacement machines, as in claim 1, wherein:
the fronts and the lips are substantially flat surfaces with planes substantially normal to the rotation axis of the disk rotary valve, the disk rotary valve comprises a pair of disks at a substantial distance from each other with a hub firmly connecting them, the fronts are arranged to face each other, the chamber ports are arranged in the space between the fronts, the distance of the fronts is substantially smaller than half of the bore of the cylinder.

6. A disk rotary valve assembly for reciprocating piston positive displacement machines, as in claim 1, wherein:
the fronts and the lips are substantially flat surfaces with planes substantially normal to the rotation axis of the disk rotary valve, the disk rotary valve comprises a pair of disks at a substantial distance from each other with a hub firmly connecting them, the fronts are arranged to face each other, the chamber ports are arranged in the space between the fronts, the distance of the fronts is substantially smaller than half of the bore of the cylinder, the cylinder head (5) comprises a cavity (11), the chamber ports are arranged at opposite sides of the cavity (11), the cavity (11) is arranged between the fronts (8).

7. A disk rotary valve assembly for reciprocating piston positive displacement machines, as in claim 1, wherein:
the same chamber ports are used for the introduction of the gas into the chamber and for the evacuation of the chamber from the gas, the arrangement of the disk rotary valve assembly is such that any leakage of compressed gas from the chamber through the chamber ports substantially returns back to the intake passageways (20) wherefrom it is recycled during the following cycle of operation.

8. A disk rotary valve assembly for reciprocating piston positive displacement machines, as in claim 1, wherein:
the fronts and the lips are substantially flat surfaces with planes substantially normal to the rotation axis of the disk rotary valve, the fronts are the external surfaces of a disk.

9. A disk rotary valve assembly for reciprocating piston positive displacement machines, as in claim 1, wherein:
the disk rotary valve is integral with a crankshaft of a compressor, a pair of connecting rods connect, by a wrist pin, the piston with a pair of crankpins of the crankshaft, wherein the connecting rods being disposed outside the cylinder footprint,
the fronts and the lips are substantially flat surfaces with planes normal to the rotation axis of the disk rotary valve,
the fronts are the external surfaces of a disk.

10. A disk rotary valve assembly for reciprocating piston positive displacement machines, as in claim 1, wherein:
the reciprocating piston positive displacement machine is a four stroke internal combustion engine; the fronts (8) and the lips (13) are substantially flat surfaces with planes substantially normal to the rotation axis (60); the disk rotary valve (1) comprises a pair of disks (3), (4) integral with a hub (2), the external diameter of the hub (2) being no less than a quarter of the bore of the cylinder (30); the fronts (8) are arranged to face each other with a part of the chamber (50) being arranged between the fronts (8); the disk rotary valve (1) comprising an intake valve port (10) and an exhaust valve port (9); during the exhaust stroke, the exhaust valve port (9) connects the chamber (50) with an exhaust passageway (17) of the cylinder head (5), during a suction stroke the intake valve port (10) connects the chamber (50) with an intake passageway (20) of the cylinder head (5), during the compression and the expansion strokes the chamber ports (12) are sealed by the fronts (8) of the disk rotary valve (1).

11. A disk rotary valve assembly for reciprocating piston positive displacement machines, as in claim 1, wherein:
the reciprocating piston positive displacement machine is a four stroke internal combustion engine; the fronts (8) and the lips (13) are substantially flat surfaces with planes substantially normal to the rotation axis (60); the disk rotary valve (1) comprises a pair of disks (3), (4) integral with a hub (2), the external diameter of the hub (2) being no less than a quarter of the bore of the cylinder (30); the fronts (8) are arranged to face each other with a part of the chamber (50) being arranged between the fronts (8); the disk rotary valve (1) comprising an intake valve port (10) and an exhaust valve port (9); during the exhaust stroke, the exhaust valve port (9) connects the chamber (50) with an exhaust passageway (17) of the cylinder head (5), during a suction stroke the intake valve port (10) connects the chamber (50) with an intake passageway (20) of the cylinder head (5), during the compression and the expansion strokes the chamber ports (12) are sealed by the fronts (8) of the disk rotary valve (1);
the disk rotary valve (1) being displaceable at a normal to the rotation axis (60) direction to vary the duration and the overlap of the intake and exhaust.

12. A disk rotary valve assembly for reciprocating piston positive displacement machines, as in claim 1,
wherein the rotation axis (60) of the disk rotary valve (1) is displaceable relative to the cylinder head (5),
and wherein the displacement of the rotary valve (1) varies the clearance between the disk rotary valve (1) and the lips (13) of the pair of oppositely arranged chamber ports (12) of the cylinder head (5).

13. A disk rotary valve assembly for reciprocating piston positive displacement machines, as in claim 1,
wherein the rotation axis (60) of the disk rotary valve (1) is displaceable relative to the cylinder head (5),
and wherein the displacement of the rotary valve (1) varies the clearance between the disk rotary valve (1) and the lips (13) of the pair of oppositely arranged chamber ports (12) of the cylinder head (5),
and wherein the pair of oppositely arranged fronts (8) of the disk rotary valve (1) are conical surfaces.

14. A disk rotary valve assembly for reciprocating piston positive displacement machines, as in claim 1,
wherein the rotation axis (60) of the disk rotary valve (1) is displaceable relative to the cylinder head (5),
and wherein the displacement of the rotary valve (1) varies the clearance between the disk rotary valve (1) and the lips (13) of the pair of oppositely arranged chamber ports (12) of the cylinder head (5),
and wherein the pair of oppositely arranged fronts (8) of the disk rotary valve (1) are conical surfaces,
and wherein the pair of oppositely arranged fronts (8) of the disk rotary valve (1) are conical surfaces, the aperture angle (f) of the conical surfaces is more than 140 degrees.

15. A disk rotary valve assembly for reciprocating piston positive displacement machines, as in claim 1,
  wherein the rotation axis (60) of the disk rotary valve (1) is displaceable relative to the cylinder head (5),
  and wherein the displacement of the rotary valve (1) varies the clearance between the disk rotary valve (1) and the lips (13) of the pair of oppositely arranged chamber ports (12) of the cylinder head (5),
  and wherein the pair of oppositely arranged fronts (8) of the disk rotary valve (1) are conical surfaces, the aperture angle (f) of the conical surfaces is more than 160 degrees.

16. A disk rotary valve assembly for reciprocating piston positive displacement machines, as in claim 1,
  wherein the rotation axis (60) of the disk rotary valve (1) is displaceable relative to the cylinder head (5),
  and wherein the displacement of the rotary valve (1) varies the clearance between the disk rotary valve (1) and the lips (13) of the pair of oppositely arranged chamber ports (12) of the cylinder head (5),
  and wherein the pair of oppositely arranged fronts (8) of the disk rotary valve (1) are conical surfaces, the aperture angle (f) of the conical surfaces is more than 175 degrees.

17. A disk rotary valve assembly for reciprocating piston positive displacement machines, as in claim 1,
  wherein the rotation axis (60) of the disk rotary valve (1) lies on a plane substantially normal to the cylinder axis.

18. A disk rotary valve assembly for reciprocating piston positive displacement machines, as in claim 1,
  wherein the chamber ports are shaped tapered.

19. A disk rotary valve assembly for reciprocating piston positive displacement machines, comprising at least:
  a cylinder;
  a cylinder head;
  a piston reciprocally fitted in the cylinder;
  a chamber defined inside the cylinder, the chamber is sealed at one side by the piston, the chamber is sealed at another side by the cylinder head;
  the cylinder head comprising inlet passageways, exhaust passageways and a cavity, the cavity being a part of the chamber;
  the cylinder head comprising a pair of oppositely arranged chamber ports at two opposite sides of the cavity, each chamber port comprising a chamber port lip at its end;
  a disk rotary valve rotatably mounted in the cylinder head and rotating in synchronization with the piston reciprocation, the disk rotary valve comprising a pair of oppositely arranged fronts, the cavity being disposed between the pair of oppositely arranged fronts with each chamber port lip being in gas tight sealing cooperation with a respective front of the disk rotary valve, the disk rotary valve comprising valve ports,
  for a part of a rotation of the disk rotary valve the chamber communicates, through the valve ports, with some of the inlet and exhaust passageways of the cylinder head, for another part of a rotation of the disk rotary valve the chamber is sealed from the cylinder head passageways,
  the arrangement is such that the total force applied on the disk rotary valve due to a high pressure inside the chamber being many times smaller than the force applied separately on each front due to the same high pressure inside the chamber.

* * * * *